United States Patent
Fatnes

(10) Patent No.: US 7,074,468 B2
(45) Date of Patent: Jul. 11, 2006

(54) FUEL TANKS

(75) Inventor: Anne Marie Fatnes, Stathelle (NO)

(73) Assignee: Borealis Technology OY, Porvoo (FI)

( * ) Notice: Subject to any disclaimer, the term of this patent is extended or adjusted under 35 U.S.C. 154(b) by 37 days.

(21) Appl. No.: 10/398,902

(22) PCT Filed: Oct. 15, 2001

(86) PCT No.: PCT/GB01/04594

§ 371 (c)(1),
(2), (4) Date: Jun. 9, 2003

(87) PCT Pub. No.: WO02/31004

PCT Pub. Date: Apr. 18, 2002

(65) Prior Publication Data

US 2004/0108315 A1 Jun. 10, 2004

(30) Foreign Application Priority Data

Oct. 13, 2000 (GB) ................................. 0025195.9

(51) Int. Cl.
*B29D 22/00* (2006.01)
*B29D 23/00* (2006.01)
*B32B 1/08* (2006.01)

(52) U.S. Cl. .................. 428/35.7; 428/500; 264/311; 264/312; 264/171.29

(58) Field of Classification Search ........... 428/35.7, 428/500; 264/310, 311, 31.2, 552, 171.26, 264/171.29
See application file for complete search history.

(56) References Cited

U.S. PATENT DOCUMENTS

| 6,136,930 A | 10/2000 | Bamberger et al. |
| 6,143,854 A | 11/2000 | Bamberger et al. |
| 6,548,441 B1 * | 4/2003 | McDaniel et al. ............ 502/84 |
| 6,573,314 B1 * | 6/2003 | Knudsen et al. ............ 523/223 |
| 2004/0108315 A1 * | 6/2004 | Fatnes ....................... 220/4.14 |

FOREIGN PATENT DOCUMENTS

| EP | 0 645 400 A | 3/1995 |
| EP | 0 645 400 A1 | 3/1995 |
| WO | WO 97/32707 * | 9/1997 |
| WO | WO 99/51648 | 10/1999 |
| WO | WO 00/11047 | 3/2000 |

OTHER PUBLICATIONS

Data Sheets for Borecene* RM8344/RM8345 Black Linear Polyethylene for Rotational Moulding; RM 0007 15.11. 1999. Ed. 6.

(Continued)

*Primary Examiner*—Michael C. Miggins
(74) *Attorney, Agent, or Firm*—Nixon & Vanderhye P.C.

(57) ABSTRACT

Liquid containes made from certain ethylene copolymers have been found to leak less, swell and wrap less than conventional plastic liquid containes. The invention therefore provides the use of an ethylene and at least one $C_{3-10}$ α-olefin copolymer having the following properties: i) $MFR_2$=2–10; ii) $MFR_{21}/MFR_2$=15–20; iii) density —925–950 $g/cm^3$; iv) molecular weight distribution Mw/MN=2.1–3.5 in the manufacture of a liquid container.

8 Claims, 4 Drawing Sheets

OTHER PUBLICATIONS

Data Sheets for Borecene* RM8402/RM8403 Linear Polyethylene For Rotational Moulding, RM 0366 15.11.1999 Ed. 3.

Data Sheets for Borecene* RM8404/RM8405 Black Linear Polyethylene for Rotational Moulding, RM0355 15.11.1999 Ed. 4.

Data Sheets for Borecene* RM8342/RM8343 Linear Polyethylene for Rotational Moulding, RM 0371 09.11.1999 Ed. 5.

Data Sheets for Borecene* ME8176/ME8177 Black Linear Polyethylene for Rotational Moulding, RM 0012 1997 08/4.

Data Sheets for ME8130/ME8131 Black Linear Polyethylene for Rotational Moulding, RM 0216 15.11.1999 Ed. 6.

* cited by examiner

FUEL TANKS

This application is the US national phase of international application PCT/GB01/04594 filed 15 Oct. 2001 which designated the U.S.

This invention relates to a process for the preparation of a liquid container, to the containers themselves and to the use of certain polymers in the manufacture of liquid containers. In particular, the invention relates to particular polymers for use in the manufacture of liquid containers, especially fuel tanks and tanks for the storage and transport of liquid chemicals.

Moulded thermoplastic articles are conventionally produced using a variety of moulding techniques, particularly injection moulding, blow moulding and rotational moulding. Injection moulding is especially suitable for manufacturing complex 3-dimensional items such as screw caps, vehicle door and instrument panels. Blow moulding is widely employed in the manufacture of plastic bottles and the like. However, for large moulded articles, e.g. large tanks, the only practical method of preparation is by rotational moulding. Moreover, since the tools required for injection moulding are expensive and the required conditions costly to generate, wherever possible, the skilled artisan will try to use rotomoulding for reasons of economy. Rotomoulding is also preferred if a small series of articles need to be prepared.

Rotational moulding is a moulding process in which a particulate polymer, the moulding powder, is filled into a mould which is placed in an oven and rotated so that the polymer melts and coats the inside surface of the mould. In order to ensure that the moulded product is defect free, the moulding powder must have a relatively small particle size and should preferably be uniform in particle size and composition.

Traditionally, liquid containers such as fuel and liquid chemical tanks have been made by rotational moulding normally employing a polyethylene polymer or copolymer. Traditionally, the polyethylene polymer or copolymer has been prepared using Ziegler Natta catalysts in a gas or slurry phase process.

A finished liquid container, e.g. a fuel tank, requires certain specific properties in order to be suitable for use. Firstly, the container must be strong and hence must have high impact strength so that, for example, a fuel tank does not rupture in a vehicle accident or a tank containing a noxious substance does not leak when dropped. Liquid containers also need good high/low temperature impact properties so that they may be exposed to extremes of temperature without failing. The containers should also have excellent environmental stress cracking resistance (ESCR) so that they can be exposed to different chemicals without adverse reaction. Poor ESCR may lead to liquid containers leaking potentially hazardous contents. Moulded tanks must not warp and hence polymers which give rise to low warpage tanks are also desired. The polymer employed to manufacture the container also needs to be one which is not degraded by the container contents and one which is not permeable to the contents.

The skilled artisan is therefore constantly searching for polymers which may help to improve any or all of these properties in order to manufacture stronger and safer liquid containers.

It has now been surprisingly found that certain polyethylene copolymers, preferably manufactured in a slurry process using metallocene catalysis can give rise to liquid containers, in particular fuel tanks and tanks for the storage and transport of liquid chemicals, in which permeation of the contained liquid through the walls of the container is approximately half that of permeation associated with currently employed Ziegler-Natta polymer compositions. Such an improvement not only prevents wastage of liquid but also prevents potentially hazardous vapours from entering the atmosphere or causing, in the case of flammable liquids, fire or, in the case of toxic liquids, health risks associated with vapour exposure. Moreover, the polyethylene copolymers proposed for use in the manufacture of liquid containers also have excellent impact resistance and ESCR properties and have been shown to reduce the swelling of containers.

Thus, viewed from one aspect the invention provides the use of an ethylene and at least one $C_{3-10}$ α-olefin copolymer having the following properties:
i) $MFR_2$=2–10
ii) $MFR_{21}/MFR_2$=15–20
iii) density=925–950 g/cm$^3$
iv) molecular weight distribution Mw/Mn=2.1–3.5 in the manufacture of a liquid container, preferably a fuel tank. It is preferred if the copolymer is obtainable by slurry polymerisation using a metallocene catalyst.

Viewed from another aspect the invention provides a process for the manufacture of a liquid container, preferably fuel tank comprising
1) copolymerising ethylene and at least one $C_{3-10}$ α-olefin in the presence of a metallocene catalyst in a slurry reactor to give a polymer composition having the following properties
i) $MFR_2$=2–10
ii) $MFR_{21}/MFR_2$=15–20
iii) density=925–950 g/cm$^3$
iv) molecular weight distribution Mw/Mn=2.1–3.5;
2) if necessary, forming said polymer into powder or pellets of 0.1–1 mm in size; and
3) rotomoulding said pellets to form said liquid container.

Viewed from yet another aspect the invention provides a fuel tank made from an ethylene and at least one $C_{3-10}$ α-olefin copolymer having the following properties
i) $MFR_2$32 2–10
ii) $MFR_{21}/MFR_2$=15–20
iii) density=925–950 g/cm$^3$
iv) molecular weight distribution Mw/Mn=2.1–3.5;
wherein the permeability of the tank walls to diesel over a period of 60 days is less than 0.1 g per cm$^2$ of tank surface area, preferably less than 0.01 g/cm$^2$ for a 50% full tank with a wall thickness of 3.6 mm.

Alternatively viewed, the invention provides a fuel tank made from an ethylene and at least one $C_{3-10}$ α-olefin copolymer having the following properties
i) $MFR_2$32 2–10
ii) $MFR_{21}/MFR_2$=15–20
iii) density=925–950 g/cm$^3$
iv) molecular weight distribution Mw/Mn=2.1–3.5;
wherein the average fuel permeability of the tank measured according to EC34 is less than 10 g per day, preferably less than 5g per day, especially less than 1 g per day.

The comonomer to be copolymerised with ethylene is a $C_{3-10}$ α-olefin. Suitable α-olefins therefore include propene, butene, pentene, hexene, octene and decene. Whilst it is within the scope of the invention to use two comonomers, e.g. butene and hexene it is preferred if only one further α-olefin is present in addition to ethylene. Especially preferred α-olefins are butene and hexene, especially hexene.

The copolymer may comprise from 0.1 to 20% of $C_{3-10}$ α-olefin, preferably 0.2 to 10%, e.g. 1 to 5%.

The copolymers to be used to manufacture the liquid containers are preferably produced using a single site catalyst, e.g. metallocene catalyst or potentially a dualsite catalyst. Suitable metallocene catalysts for use in the invention may be any conventional metallocene catalyst. As used herein, the term metallocene is used to refer to all catalytically active metal:η-ligand complexes in which a metal is complexed by one, two or more open chain or closed ring η-ligands. The use of bridged bis-η-ligand metallocenes, single η-ligand "half metallocenes", and bridged η-σ ligand "scorpionate" metallocenes is particularly preferred. The metal in such complexes is preferably a group 4, 5, 6, 7 or 8 metal or a lanthanide or actinide, especially a group 4, 5 or 6 metal, particularly Zr, Hf or Ti. The η-ligand preferably comprises an $\eta^4$ or $\eta^5$ open chain or an $\eta^5$-cyclopentadienyl ring, optionally with a ring or chain carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Suitable η-ligands, include those of formula II discussed above. Examples of such homo or heterocyclic cyclopentadienyl ligands are well known in the art (see e.g. EP-A-416815, WO96/04290, EP-A-485821, EP-A-485823, U.S. Pat. No. 5,276,208 and U.S. Pat. No. 5,145,819).

Besides the η-ligand, the metallocene complex used according to the invention may include other ligands; typically these may be halide, hydride, alkyl, aryl, alkoxy, aryloxy, amide, carbamide or other two electron donor groups. Any hydrocarbyl ligand here will generally contain up to 20 carbons, preferably up to 10 carbons, e.g. up to 6 carbons.

Metallocene catalysts are conventionally employed in the presence of a cocatalyst. Suitable cocatalysts are well known and include alkyl metal compounds, in particular alumoxanes. Suitable alumoxanes include $C_{1-10}$ alkyl alumoxanes, e.g. methyl alumoxane (MAO) and isobutyl alumoxanes (e.g. tetra and hexaisobutyl alumoxane, TIBAO and HIBAO), especially MAO. Alumoxane co-catalysts are described by Hoechst in WO-A-94/28034. These are linear or cyclic oligomers having up to 40, preferably 3 to 20, —[Al(R")O]— repeat units (where R" is hydrogen, $C_{1-10}$ alkyl, preferably methyl, or $C_{6-18}$ aryl or mixtures thereof).

If desired the metallocene or metallocene/cocatalyst mixture may be used in unsupported form or it may be precipitated and used as such. However the metallocene or its reaction product with the cocatalyst is preferably introduced into the polymerization reactor in supported form, e.g. impregnated into a porous particulate support, as is well known in the art.

The particulate support material used is preferably an organic or inorganic material, e.g. a polymer (such as for example polyethylene, polypropylene, an ethylene-propylene copolymer, another polyolefin or polystyrene or a combination thereof). Such polymeric supports may be formed by precipitating a polymer or by a prepolymerization, eg of monomers used in the polymerization for which the catalyst is intended. However, the support is especially preferably a metal or pseudo metal oxide such as silica, alumina or zirconia or a mixed oxide such as silica-alumina, in particular silica, alumina or silica-alumina.

Especially preferably the support is a porous material so that the metallocene may be loaded into the pores of the support, e.g. using a process analogous to those described in WO94/14856 (Mobil), WO95/12622 (Borealis) and WO96/00243 (Exxon). The particle size is not critical but is preferably in the range 5 to 200 μm, more preferably 20 to 80 μm.

Before loading, the particulate support material is preferably calcined, i.e. heat treated, preferably under a non-reactive gas such as nitrogen. This treatment is preferably at a temperature in excess of 100° C., more preferably 200° C. or higher, e.g. 200–800° C., particularly about 300° C. The calcination treatment is preferably effected for several hours, e.g. 2 to 30 hours, more preferably about 10 hours.

The support may be treated with an alkylating agent before being loaded with the metallocene as is known in the art. Treatment with the alkylating agent may be effected using an alkylating agent in a gas or liquid phase, e.g. in an organic solvent for the alkylating agent. The alkylating agent may be any agent capable of introducing alkyl groups, preferably $C_{1-6}$ alkyl groups and most especially preferably methyl groups. Such agents are well known in the field of synthetic organic chemistry. Preferably the alkylating agent is an organometallic compound, especially an organoaluminium compound (such as trimethylaluminium (TMA), dimethyl aluminium chloride, triethylaluminium) or a compound such as methyl lithium, dimethyl magnesium, triethylboron, etc.

Following treatment of the support material with the alkylating agent, the support is preferably removed from the treatment fluid and any excess treatment fluid is allowed to drain off.

The optionally alkylated support material is loaded with the metallocene, preferably using a solution of the metallocene in an organic solvent therefor, e.g. as described in the patent publications referred to above.

Alternatively, a cocatalyst, e.g. an alumoxane or an ionic catalyst activator (such as a boron or aluminium compound, especially a fluoroborate) may also be mixed with or loaded onto the catalyst support material. This may be done subsequently or more preferably simultaneously to loading of the metallocene, for example by including the cocatalyst in the solution of the metallocene or, by contacting the metallocene loaded support material with a solution of the cocatalyst or catalyst activator, e.g. a solution in an organic solvent. Alternatively however, any such further material may be added to the metallocene loaded support material in the polymerization reactor or shortly before dosing of the catalyst material into the reactor.

In this regard, as an alternative to an alumoxane it may be preferred to use a fluoroborate catalyst activator, especially a $B(C_6F_5)_3$ or more especially a $^\ominus B(C_6F_5)_4$ compound, such as $C_6H_5N(CH_3)_2H{:}B(C_6F_5)_4$ or $(C_6H_5)_3C{:}B(C_6F_5)_4$. Other borates of general formula $(cation^+)_a (borate^-)_b$ where a and b are positive numbers, may also be used.

The polymerisation process of the invention is typically conducted in the presence of a diluent. As a diluent, a linear, branched or cyclic saturated hydrocarbon such as butane, propane, pentane, hexane, heptane, octane, cyclohexane or methylcyclohexane may be used.

Polymerisation to produce the polymer for use in the manufacture of the liquid container preferably takes place in the slurry phase. It is envisaged that manufacturing in this way may give rise to polymers which show improved permeability properties over similar polymers made in the gas phase. Slurry phase polymerisation can be conducted under standard slurry conditions.

For slurry reactors, the reaction temperature will generally be in the range 60 to 110° C. (e.g. 85–110° C.), the reactor pressure will generally be in the range 5 to 80 bar (e.g. 25–65 bar), and the residence time will generally be in the range 0.3 to 5 hours (e.g. 0.5 to 2 hours). The diluent used will generally be an aliphatic hydrocarbon having a boiling point in the range −70 to +100° C., especially isobutane.

Polymers suitable for use in the manufacture of liquid containers according to the invention are available for sale. Particularly preferred polymer grades are sold by Borealis A/S under the Trade Names ME 8170, ME 8171, ME 8176, ME 8177, ME 8178, ME 8179, RM 8402, RM 8403, RM 8342, RM 8343, RM 8344, RM 8345, RM 7402, RM 7403, RM 7404, RM 7405, RM 8404 and RM 8405.

The polymer must have certain properties to be suitable for use in the invention. The $MFR_2$ of the polymer should be between 2 to 10, especially 2 to 6. MFR is determined using ASTM D-1238 (190° C./2.16 kg). The ratio of $MFR_{21}/MFR_2$ should be between 15 to 20, especially 16 to 18. $MFR_{21}$ is determined using ASTM D-1238 (190° C./21.6 kg). The density of the polymer should range from 925 to 950 g/cm$^3$, especially 930–945 g/cm$^3$. The molecular weight distribution Mw/Mn should range from 2.1 to 3.5, especially 2.2 to 2.6, e.g. 2.3. The actual Mw of the polymer may be between 70,000 to 120,000, e.g 80,000 to 105,000. The Mn of the polymer may be between 30,000 to 50,000, preferably 35,000 to 45,000.

Polyethylene copolymers having these properties have been surprisingly found to give rise to liquid containers which are almost impervious to the liquid in the tank. Moreover, containers made using these copolymers have surprisingly been found to swell much less than containers made with conventional polymers. Finally, many mechanical properties of the copolymers discussed above are improved over conventional rotomoulding polymers. Excellent results have in fact been noted in tensile modulus, stress at yield, strain at yield and elongation at break. The polymers have in addition high impact strength and excellent ESCR.

Hence, whilst polymers having suitable properties for use in the invention are known, never before has it been appreciated that these polymers would be particularly advantageous in the manufacture of liquid containers due to the factors mentioned above. It is also envisaged that these polymers may give rise to tanks which have low warpage.

In this regard, the polymers of use in the invention are especially suitable for rotational moulding. In rotomoulding the flow of the polymer material is controlled by the force of gravity as the mould is being rotated around both its axes. Due to the relatively slow speed of rotation, the process involves the application of rather low shear rates to the polymer and hence it is observed that unfavourable shear viscosity at low shear rates limits the cycle time of the process. Polymers produced from single site metallocene catalysts, such as those of use in the present invention, have lower viscosity at low shear rates. Thus, such polymers flow more readily at the shear rates present in rotomoulding and are therefore preferred over Ziegler-Natta species.

It is also envisaged that the liquid containers of the invention could be manufactured using a blend of two suitable copolymers or a blend of homo and copolymers. Such blends would be suitable for use in the manufacture of tanks if the blend exhibited a narrow molecular weight distribution.

In order to ensure that copolymer particles are in the correct size for rotational moulding the products of any polymerisation reaction may be converted to powder form or pelletized to a particle size of approximately 0.1 to 0.5 mm, preferably 0.3 mm using standard technology. Hence, suitably sized pellets may be prepared by grinding.

Alternatively micropellets may be produced using the technique described in WO 00/35646 which is hereby incorporated by reference. By this method a mixture of polyolefin and optionally at least one additive is extruded in melt form through a die and pelletised to give particles having a particular size distribution. The particles are then dried to very low levels of moisture to improve rotomouldability. It is envisaged that by using this technique for manufacturing the polymer pellets to be rotomoulded, the resulting liquid containers may be even less pervious to the liquids which they contain.

Alternatively, the polymerisation can be set up such that the reactor powder is suitable for use without further manipulation. In one embodiment of the invention rotomoulding may be carried out by combining polyolefin powder with a masterbatch of UV-stabiliser-loaded polyolefin powder in line with the teaching of WO00/11065 which is hereby incorporated by reference.

The polymer powder or pellets can comprise any standard additives e.g. one or more selected from colouring agents, stabilisers, antioxidants, UV-absorbers, anti-static agents, lubricants and fillers. In particular, fuel tanks are preferably black and carbon black is a particularly preferred colouring agent.

Rotational moulding may take place under standard conditions. The polymer powder is placed in the mould which is then transferred to an oven and rotated, preferably about two axes to distribute the polymer powder over the hot surfaces of the mould. The heating cycle is continued until all of the powder has melted and formed a thick, continuous layer within the mould. The mould is then removed from the oven and cooled until the resin has solidified. The mouolded part is then removed.

The length of time which the mould must be heated depends on the nature of the article being moulded, the amount of resin present and the temperature of the oven. Typical rotomoulding temperatures are 230° C. to 350° C., more particularly 260° C. to 320° C. Heating time is chosen such that the inner air temperature in the mould is 160° C. to 300° C., more preferably 170° C. to 200° C. This temperature can be measured using a Rotolog® or similar equipment to monitor the temperature or it may be chosen based on previous experience. Cooling may be carried out under a stream of air, water spray or mist or simply in ambient air at room temperature. A combination of these methods may also be employed. Preferably cooling is achieved using a combination of blown air followed by ambient air. Cooling times are normally of similar magnitude to heating times or slightly longer. The moulded tank may be removed from its mould at any convenient time although it is preferred if it is removed when it has cooled to a temperature of 60° C. to 100° C.

The skilled artisan is able to manipulate the temperature, time and rotation speed/ratio within a rotomoulding apparatus to ensure that well-formed moulded articles are produced.

The liquid containers may be drums or tanks and may be designed to carry a wide range of liquids, e.g. paints, lacquers, acids, acetates, cleaning fluids, lubricating and other oils etc. Preferably however, the container is a fuel tank suitable for use on any diesel, biodiesel (SISOIL E), petrol, kerosene or alcohol powered machine, e.g. a car, van, lorry, agricultural vehicle or machine, ambulance, fire engine, train, ship, motorcycle, generator, lawnmower, bus etc.

The fuel tanks of the invention are particularly of use with vehicles such as tractors and trucks are particularly designed to carry diesel fuel. The tanks are preferably of a volume such that when full a fuel tank in use would contain between 10 and 1000 litres, e.g. 75 to 150 litres depending on the nature of the vehicle or machine.

When empty, the tanks should preferably weigh between 3 kg and 200 kg, e.g. 5 to 100 kg again depending on the type of vehicle or machine.

The walls of the tank should preferably be between 2 and 20 mm thick, especially 3 to 8 mm thick. As will be abundantly clear to the skilled person, the larger the tank the thicker the walls required. For example a 100 litre tank may require walls of 5 to 7 mm in thickness whereas a 1000 litre tank may require walls of greater than 10 mm. Thicker wall give rise to less permeation however, thicker walls also increase costs and weight. The values quoted above ensure that the tank is of sufficient strength and low permeability whilst not being too heavy or expensive to manufacture.

The fuel tanks of the invention are such that over a period of two months, preferably no more than 1.25%, preferably no more than 1%, especially no more than 0.75% of the fuel, e.g. diesel within the tanks should be lost irrespective of the size or wall thickness of the tank.

All documents mentioned herein are hereby incorporated by reference. The invention will now be illustrated with reference to the following non-limiting examples and Figures.

EXAMPLE 1

Tests were carried out in line with the provisions of Regulation EC34.

Various polymer grades (All of which are available for sale from Borealis A/S) were rotomoulded to form tanks. The rotomoulding oven was maintained at 270° C. and moulding took place over 14 minutes. Rotation speed ratio was 9/1.4 rpm using an aluminium mould of dimensions such that the tanks formed were all cubes having sides of 20 cm. The tanks were cooled for 6 minutes under a stream of air and cooled for a further 10 minutes in an ambient still atmosphere.

The following polymer Grades were employed: Grade ME8131 is a Black linear polyethylene and butene powder produced in the gas phase using Ziegler-Natta catalysis. ME8171, ME8177 and ME8179 are all black linear polyethylene/hexene copolymer powders made in the slurry phase using metallocene catalysis.

Each tank was weighed and its 50% full volume measured. The results are given in the Table below. The tank wall thicknesses were 3.6 mm giving an approximate volume of $(19.64)^3$ cm$^3$=7.575 litres. The internal surface area of the tank was therefore $(19.64\times19.64\times6)$=2314 cm$^2$.

Each tank was half-filled with diesel, white spirit or petrol and stored for 4 weeks at a temperature of 40° C. After this period, all the tanks were emptied and fresh diesel, white spirit or petrol added until the tank was 50% filled. The tanks were sealed and stored at 40° C. The amount of liquid remaining in each tank was measured by weighing the tank at intervals of approximately every two weeks. The results are also presented in the tables below.

TABLE 1

Tanks containing Diesel
(Commercially available Grade)

| | Empty | | WEIGHT OF TANK ON DATE GIVEN (g) | | | | |
|---|---|---|---|---|---|---|---|
| Grade | Wt (g) | Vol. (l) | Date 7 Feb | Date 24 Feb | Date 7 Mar | Date 21 Mar | Date 3 Apr |
| ME8171/1 | 701.2 | 3.39 | 3460.1 | 3456.7 | 3452.6 | 3447.1 | 3441.1 |
| ME8171/2 | 711.3 | 3.26 | 3364.9 | 3361.5 | 3357.6 | 3352.3 | 3346.5 |
| ME8171/3 | 697.2 | 3.30 | 3384.6 | 3381.2 | 3377.3 | 3371.8 | 3366 |
| ME8177/1 | 706.3 | 3.31 | 3404.5 | 3400.8 | 3396.7 | 3390.7 | 3384.8 |
| ME8177/2 | 702.8 | 3.34 | 3420.2 | 3416.58 | 3412.6 | 3406.9 | 3401.1 |
| ME8177/3 | 703.4 | 3.31 | 3373.5 | 3369.8 | 3365.7 | 3359.8 | 3353.4 |
| ME8179/1 | 702.2 | 3.35 | 3406.3 | 3403.2 | 3399.2 | 3393.4 | 3387.5 |
| ME8179/2 | 703.5 | 3.31 | 3369.7 | 3366.3 | 3362.4 | 3356.9 | 3350.9 |
| ME8179/3 | 699.5 | 3.37 | 3414 | 3410.4 | 3406.5 | 3400.4 | 3394.3 |
| ME8131/1 | 703 | 3.21 | 3292.9 | 3285 | 3278 | 3267.9 | 3258 |
| ME8131/2 | 705.2 | 3.31 | 3372.3 | 3364.2 | 3356.9 | 3346.7 | 3336.3 |
| ME8131/3 | 694.8 | 3.27 | 3333.7 | 3325 | 3317.5 | 3306.4 | 3295.4 |

Figure 1:
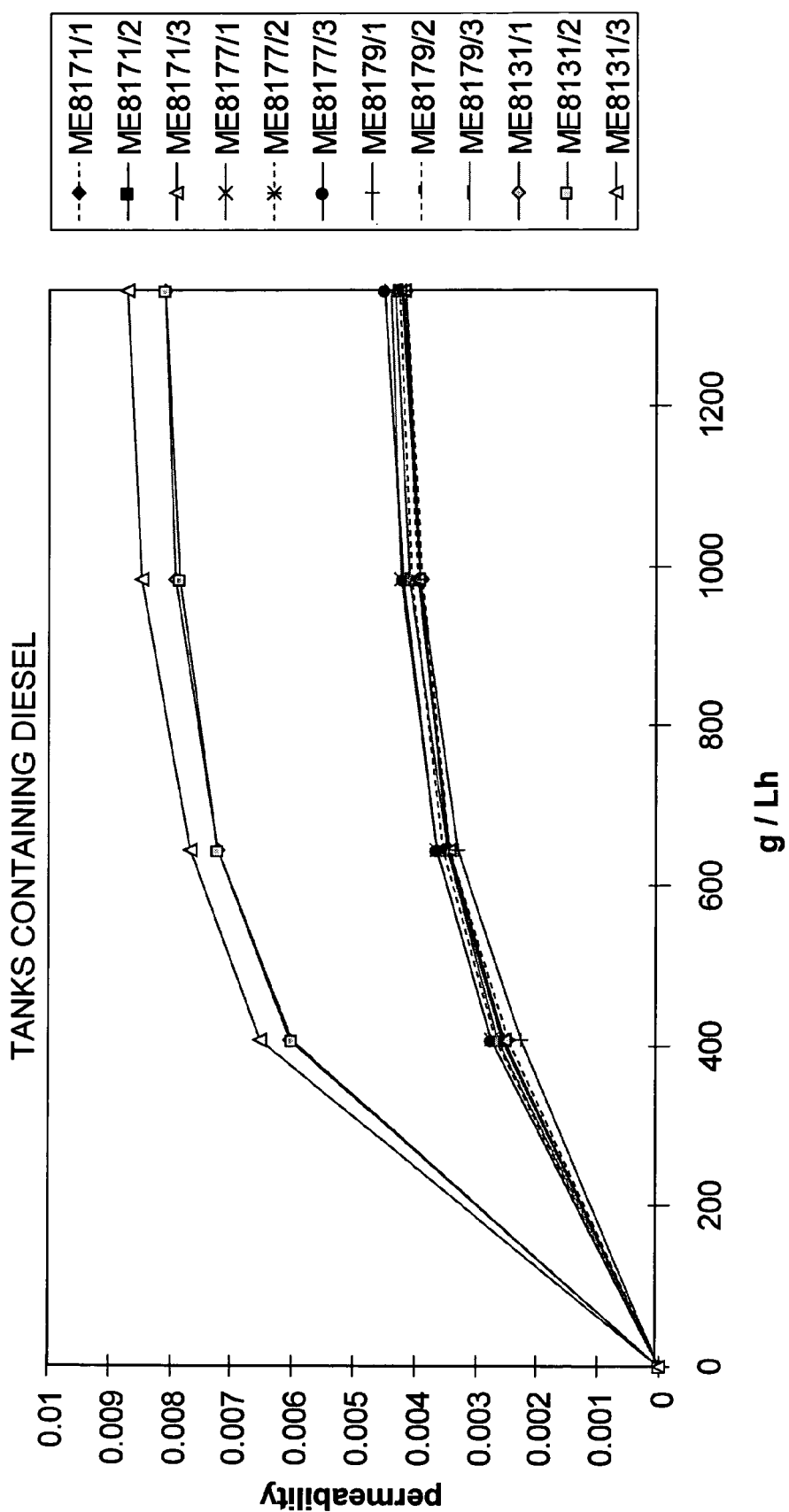
FIG. 1 shows the permeability of a tank made from various polymers to diesel over time. Permeability is measured in weight loss in grammes per litre of liquid in the tank per hour (g/Lh).

These results are depicted graphically in FIG 1.

TABLE 2

Tanks Containing White Spirit
(White spirit used was SHELLSOL H)

| | Empty | | WEIGHT OF TANK ON DATE GIVEN (g) | | | | |
|---|---|---|---|---|---|---|---|
| Grade | Wt (g) | Vol. (l) | Date 7 Feb | Date 22 Feb | Date 7 Mar | Date 21 Mar | Date 3 Apr |
| ME8171/1 | 699.8 | 3.18 | 3292.1 | 3286.3 | 3275.7 | 3263.8 | 3250.9 |
| ME8171/2 | 707.5 | 3.20 | 3316.6 | 3310.9 | 3299.8 | 3287.4 | 3274.5 |
| ME8171/3 | 697.3 | 3.09 | 3221.6 | 3216.2 | 3204.8 | 3192.1 | 3179.1 |
| ME8177/1 | 705 | 3.18 | 3298.1 | 3291.3 | 3279.5 | 3266.6 | 3252.5 |
| ME8177/2 | 707.6 | 3.14 | 3267.4 | 3261.1 | 3249.4 | 3236.4 | 3222.6 |
| ME8177/3 | 703.8 | 3.16 | 3276.5 | 3270.1 | 3257.7 | 3244.3 | 3230.7 |
| ME8179/1 | 694.3 | 3.20 | 3305.5 | 3299.3 | 3287.9 | 3275.2 | 3262.5 |
| ME8179/2 | 696.5 | 3.13 | 3252 | 3246.3 | 3235.3 | 3222.3 | 3209.7 |
| ME8179/3 | 706.1 | 3.23 | 3335.8 | 3330.1 | 3319.8 | 3308.6 | 3296.1 |
| ME8131/1 | 697.2 | 3.10 | 3225.3 | 3208.4 | 3188.6 | 3167.4 | 3146.1 |
| ME8131/2 | 701.5 | 3.14 | 3260.9 | 3244.5 | 3224.8 | 3203.2 | 3182 |
| ME8131/3 | 713 | 3.06 | 3210.9 | 3193.4 | 3173.5 | 3151.8 | 3130.2 |

Figure 2:
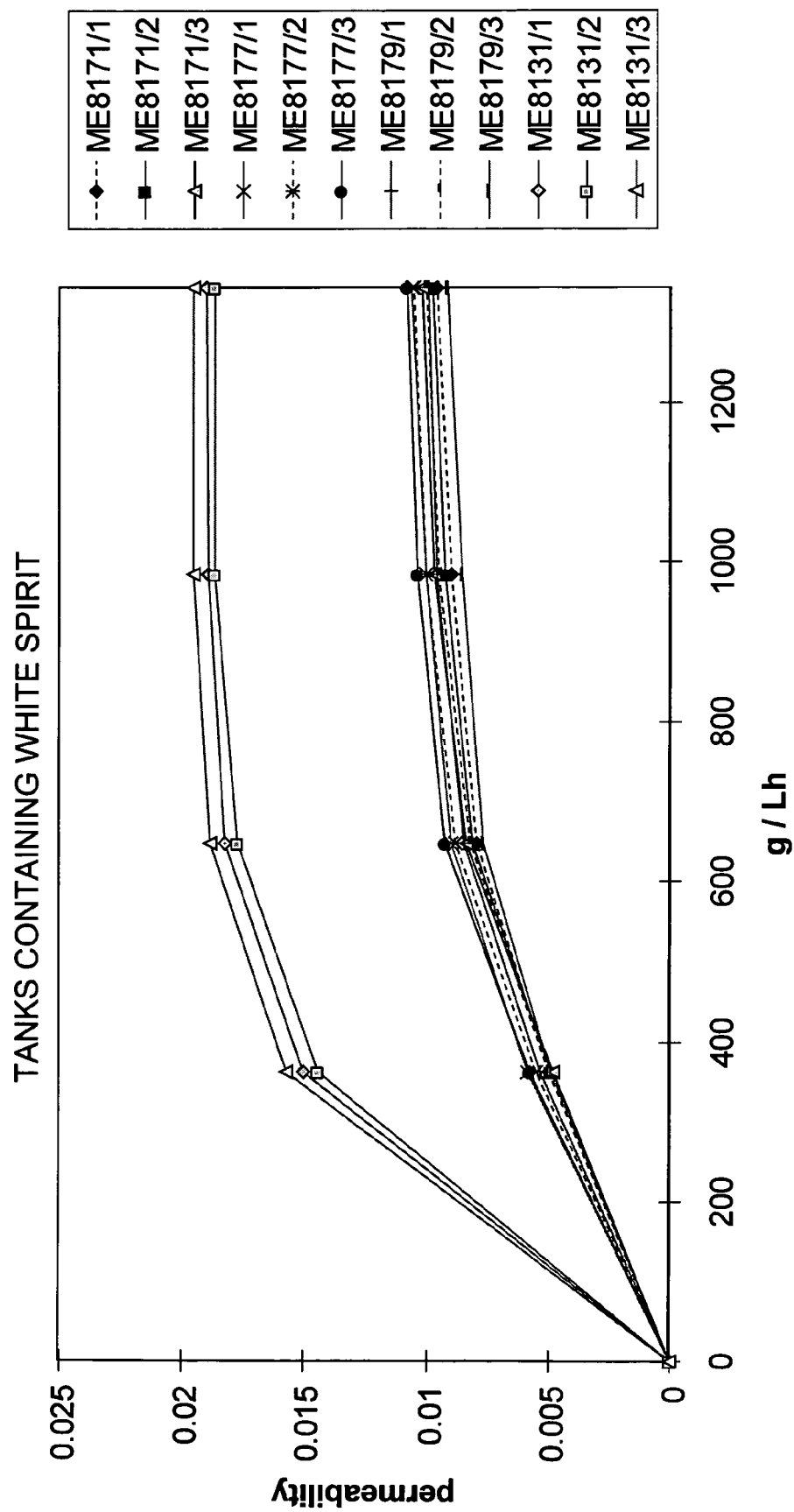
FIG. 2 shows the permeability of a tank made from various polymers to white spirit over time. Permeability is measured in weight loss in grammes per litre of liquid in the tank per hour (g/Lh).

These results are depicted graphically in FIG. 2.

TABLE 3

Tanks containing Petrol
(Commercially available 95 Octane unleaded)

| Grade | Empty Wt (g) | Vol. (l) | WEIGHT OF TANK ON DATE GIVEN (g) | | | | |
|---|---|---|---|---|---|---|---|
| | | | Date 8 Feb | Date 22 Feb | Date 7 Mar | Date 21 Mar | Date 4 Apr |
| ME8171/1 | 704.5 | 2.92 | 3064.3 | 2980.1 | 2880.1 | 2774.9 | 2674.7 |
| ME8171/2 | 702.1 | 2.93 | 3068.5 | 2983.2 | 2881.5 | 2775.2 | 2674.2 |
| ME8171/3 | 699.7 | 3.23 | 3302.9 | 3207.3 | 3096.4 | 2980.7 | 2869.3 |
| ME8177/1 | 706.7 | 2.91 | 3056.3 | 2963 | 2853.3 | 2737.6 | 2626.9 |
| ME8177/2 | 698.5 | 2.94 | 3071.3 | 2977 | 2866.4 | 2749.7 | 2638.9 |
| ME8177/3 | 700.2 | 3.34 | 3393.5 | 3292.2 | 3176.3 | 3052.8 | 2935 |
| ME8179/1 | 696.1 | 3.03 | 3140 | 3040.5 | 2924.8 | 2801.3 | 2683.2 |
| ME8179/2 | 707.9 | 2.88 | 3034.7 | 2942.2 | 2835.2 | 2719.9 | 2613.3 |
| ME8179/3 | 700 | 3.45 | 3475.8 | 3374 | 3257.3 | 3132.6 | 3012.6 |
| ME8131/1 | 706 | 2.86 | 3017.5 | 2870.4 | 2690.7 | 2521 | 2357.3 |
| ME8131/2 | 704.3 | 2.87 | 3027.2 | 2866.9 | 2688.7 | 2495.9 | 2315.1 |
| ME8131/3 | 713.4 | 3.47 | 3505.5 | 3341.1 | 3155.3 | 2954 | 2764.1 |

(In tables 1 to 3 the Vol. column shows the 50% full volume)

Figure 3:
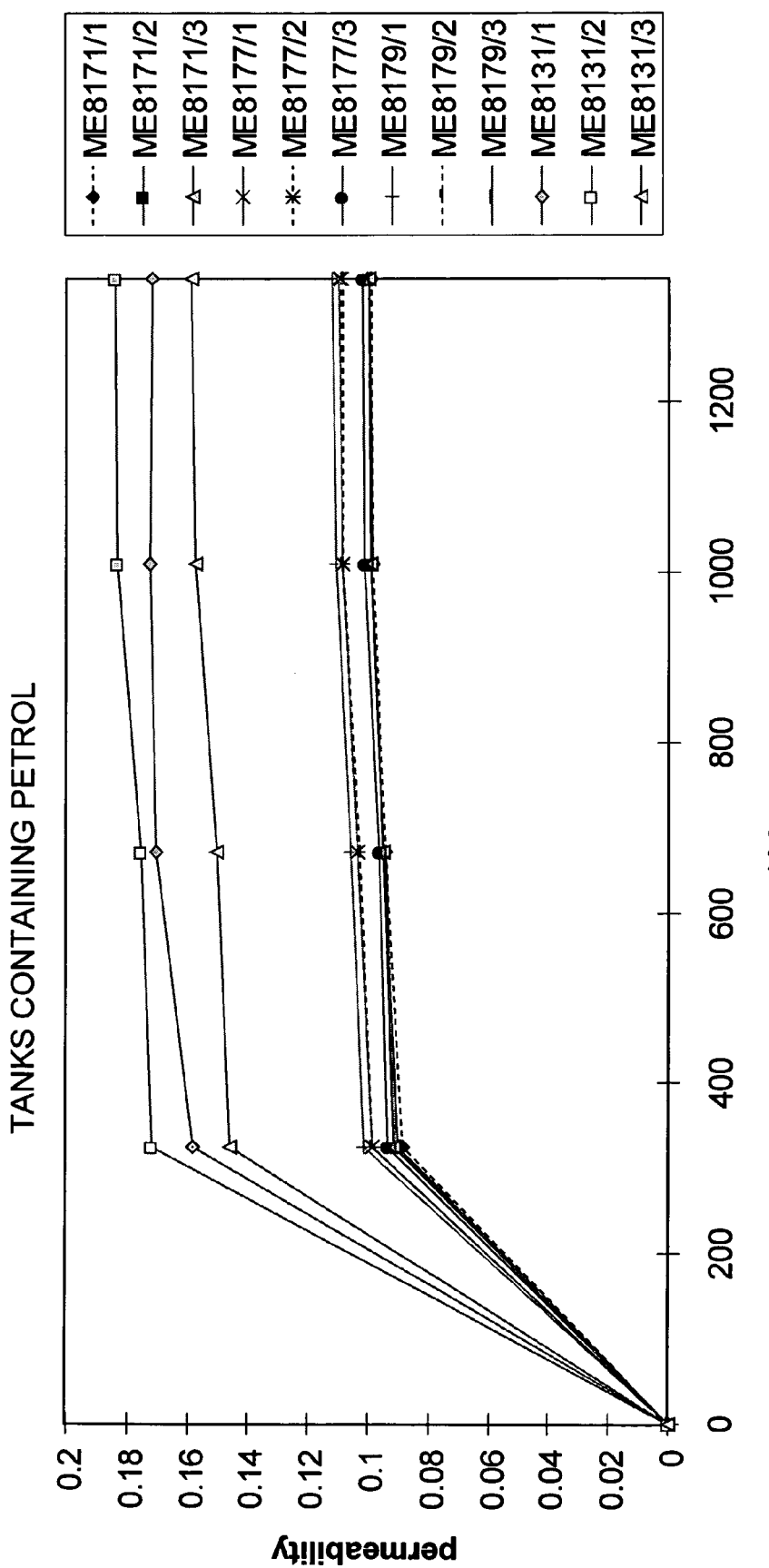
FIG. 3 shows the permeability of a tank made from various polymers to petrol over time. Permeability is measured in weight loss in grammes per litre of liquid in the tank per hour (g/Lh).
Figure 4:
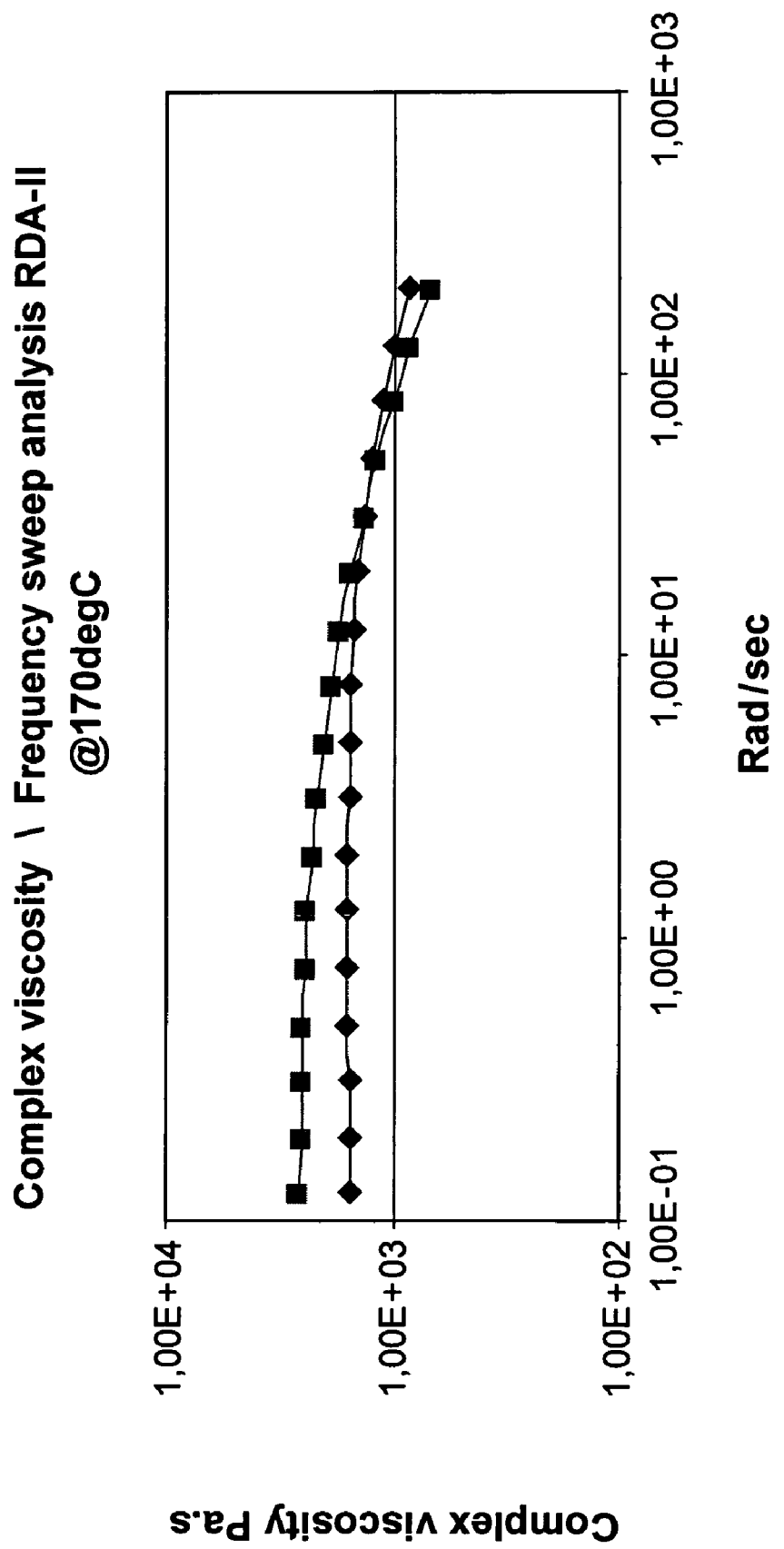
FIG. 4 shows the relationship between shear rates (Radiants/sec) and complex viscosity (Pa) for the metallocene polymer grade ME8171 and the Ziegler-Natta polymer grade ME8131. At low shear rates the viscosity of the metallocene grade is lower making such a polymer more suitable for rotomoulding.

These results are depicted graphically in FIG. 3.

EXAMPLE 2

The presence of diesel, white spirit or petrol in a tank is known to make a tank swell. Thus, swelling was also measured according to draft prEN ISO 16101. A compression moulded sample of 38 mm×12 mm×2 mm was prepared and immersed in petrol, diesel or white spirit at a temperature of 40° C. Compression moulding was carried out at 180° C. according to ISO 1872–2 (1997). The mass of the test samples were measured at intervals by removing the samples from the liquid, wiping dry and weighing. The results are presented in the tables below. Initial sample weights were between 0.77 and 0.81 g.

TABLE 4

Swelling of samples in Diesel

| Grade | Initial Swell | Weight change (g) after period stated | | | |
|---|---|---|---|---|---|
| | | After 407 Hours | After 644 Hours | After 984 Hours | After 1344 hours |
| ME8171/1 | 0 | 0.0025 | 0.003 | 0.004 | 0.004 |
| ME8171/2 | 0 | 0.0026 | 0.003 | 0.004 | 0.004 |
| ME8171/3 | 0 | 0.0025 | 0.003 | 0.004 | 0.004 |
| ME8177/1 | 0 | 0.0027 | 0.004 | 0.004 | 0.004 |
| ME8177/2 | 0 | 0.0027 | 0.004 | 0.004 | 0.004 |
| ME8177/3 | 0 | 0.0027 | 0.004 | 0.004 | 0.005 |
| ME8179/1 | 0 | 0.0023 | 0.003 | 0.004 | 0.004 |
| ME8179/2 | 0 | 0.0025 | 0.003 | 0.004 | 0.004 |
| ME8179/3 | 0 | 0.0026 | 0.003 | 0.004 | 0.004 |
| ME8131/1 | 0 | 0.0060 | 0.007 | 0.008 | 0.008 |
| ME8131/2 | 0 | 0.0060 | 0.007 | 0.008 | 0.008 |
| ME8131/3 | 0 | 0.0065 | 0.008 | 0.008 | 0.009 |

TABLE 5

Swelling of samples in White Spirit

| Grade | Initial Swell | Weight change (g) after period stated | | | |
|---|---|---|---|---|---|
| | | After 363 Hours | After 648 Hours | After 984 Hours | After 1344 hours |
| ME8171/1 | 0 | 0.0050 | 0.008 | 0.009 | 0.010 |
| ME8171/2 | 0 | 0.0049 | 0.008 | 0.009 | 0.010 |
| ME8171/3 | 0 | 0.0048 | 0.008 | 0.010 | 0.010 |
| ME8177/1 | 0 | 0.0059 | 0.009 | 0.010 | 0.011 |
| ME8177/2 | 0 | 0.0055 | 0.009 | 0.010 | 0.011 |
| ME8177/3 | 0 | 0.0058 | 0.009 | 0.010 | 0.011 |
| ME8179/1 | 0 | 0.0053 | 0.008 | 0.010 | 0.010 |
| ME8179/2 | 0 | 0.0050 | 0.008 | 0.010 | 0.010 |
| ME8179/3 | 0 | 0.0049 | 0.008 | 0.009 | 0.009 |
| ME8131/1 | 0 | 0.0150 | 0.018 | 0.019 | 0.019 |
| ME8131/2 | 0 | 0.0144 | 0.018 | 0.019 | 0.019 |
| ME8131/3 | 0 | 0.0158 | 0.019 | 0.020 | 0.020 |

TABLE 6

Swelling of samples in Petrol

| Grade | Initial Swell | Weight change (g) after period stated | | | |
|---|---|---|---|---|---|
| | | After 325 Hours | After 672 Hours | After 1008 Hours | After 1344 hours |
| ME8171/1 | 0 | 0.089 | 0.094 | 0.098 | 0.099 |
| ME8171/2 | 0 | 0.090 | 0.095 | 0.099 | 0.100 |
| ME8171/3 | 0 | 0.091 | 0.095 | 0.099 | 0.100 |
| ME8177/1 | 0 | 0.099 | 0.104 | 0.109 | 0.110 |
| ME8177/2 | 0 | 0.099 | 0.104 | 0.109 | 0.110 |
| ME8177/3 | 0 | 0.093 | 0.097 | 0.101 | 0.102 |
| ME8179/1 | 0 | 0.101 | 0.106 | 0.111 | 0.112 |
| ME8179/2 | 0 | 0.099 | 0.103 | 0.109 | 0.109 |
| ME8179/3 | 0 | 0.091 | 0.094 | 0.099 | 0.100 |
| ME8131/1 | 0 | 0.158 | 0.170 | 0.172 | 0.172 |
| ME8131/2 | 0 | 0.172 | 0.175 | 0.183 | 0.184 |
| ME8131/3 | 0 | 0.146 | 0.150 | 0.158 | 0.159 |

EXAMPLE 3

A rotomoulded tank (made as in Example 1) was completely filled with diesel, petrol or white spirit and stored for a period of 6 weeks at a temperature of 40° C. The tank was emptied and test specimens were punched from a side of the tank which had been positioned horizontally.

Various parameters of the test specimens were measured. Tensile modulus was measured according to ISO 527 and stress at yield, strain at yield and elongation at break measured according to ISO 527–5A. Comparisons were made with polymer specimens which had not been exposed to the fuels. The results are illustrated in the tables below in which data in the Ref. rows indicate data obtained from polymer not exposed to the fuels.

TABLE 7

| | ME8131 | | | |
|---|---|---|---|---|
| Sample | Tensile Mod. (MPa) | Stress at yield MPa | Strain at yield % | Elong. at break % |
| Petrol | 355 | 14.5 | 16 | 200 |
| Ref | 600 | 17 | 12 | 195 |

TABLE 8

ME8171

| Sample | Tensile Mod. (MPa) | Stress at yield MPa | Strain at yield % | Elong. at break % |
|---|---|---|---|---|
| Petrol | 440 | 18 | 14.5 | >600 |
| Diesel | 505 | 19 | 15 | |
| White spirit | 480 | 18.5 | 15 | |
| Ref | 780 | 21 | 11 | >600 |

TABLE 9

ME8177

| Sample | Tensile Mod. (MPa) | Stress at yield MPa | Strain at yield % | Elong. at break % |
|---|---|---|---|---|
| Petrol | 470 | 18 | 15.5 | >600 |
| Diesel | 485 | 18.5 | 15.5 | |
| White spirit | 460 | 18 | 15.5 | |
| Ref. | 810 | 21 | 11 | >600 |

TABLE 10

ME8179

| Sample | Tensile Mod. (MPa) | Stress at yield MPa | Strain at yield % | Elong. at break % |
|---|---|---|---|---|
| Petrol | 395 | 17 | 16 | >600 |
| Diesel | 440 | 17.5 | 15.5 | |
| White spirit | 420 | 17 | 16 | |
| Ref. | 710 | 20 | 11 | >600 |

As is shown in the Examples above, the permeability to diesel, petrol and white spirit of polymer grades made in the slurry phase using metallocene catalysts is approximately half that of conventionally employed Ziegler-Natta grades. Moreover, tanks made using the preferred polymer grades show less swelling on addition of the fuels and have improved mechanical properties compared to polymers made using Ziegler-Natta catalysis.

The invention claimed is:

1. A process for the manufacture of a fuel tank comprising:
   1) copolymerizing ethylene and at least one $C_{3-10}$ α-olefin in the presence of a metallocene catalyst in a slurry reactor at a pressure of 5 to 80 bars to give a polymer composition having the following properties:
      i) $MFR_2$=2–10
      ii) $MFR_{21}/MFR_2$=15–20
      iii) density=925–950 kg/m$^3$
      iv) molecular weight distribution Mw/Mn 2.1–3.5,
   2) if necessary, forming said polymer into powder or pellets of 0.1–1 mm in size; and
   3) rotomoulding said pellets to form said fuel tank.

2. A process as claimed in claim 1 wherein said copolymer has the following properties:
   i) $MFR_2$=2–6
   ii) $MFR_{21}/MFR_2$=16–18
   iii) density 930–945 kg/m$^3$
   iv) molecular weight distribution Mw/Mn 2.2–2.6.

3. A process as claimed in claim 1 wherein said fuel tank is for a diesel powered vehicle.

4. A process as claimed in claim 1 wherein the copolymer has a comonomer content of 1 to 5%.

5. A process as claimed in claim 1 wherein said $C_{3-10}$ α-olefin is butene or hexene.

6. A process as claimed in claim 5 wherein said $C_{3-10}$ α-olefin is hexane.

7. A fuel tank made from a metallocene produced ethylene and at least one $C_{3-10}$ α-olefin copolymer having the following properties:
   i) $MFR_2$=2–10
   ii) $MFR_{21}/MFR_2$=15–20
   iii) density=925–950 kg/m$^3$
   iv) molecular weight distribution Mw/Mn=2.1–3.5;
said copolymer being in the form of powder or pellets of 0.1–1 mm in size wherein the average fuel permeability of the tank measured according to EC34 is less than 10 g per day.

8. A fuel tank made from a metallocene produced ethylene and at least one $C_{3-10}$ α-olefin copolymer having the following properties:
   i) $MFR_2$=2–10
   ii) $MFR_{21}/MFR_2$=15–20
   iii) density=925–950 kg/m$^3$
   iv) molecular weight distribution Mw/Mn=2.1–3.5;
said copolyiner being in the form of powder or pellets of 0.1–1 mm in size wherein the permeability of the tank walls to diesel fuel over a period of 60 days is less than 0.1 g per cm$^2$ of tank surface area for a 50% full tank with a wall thickness of 3.6 mm.

* * * * *